US007895523B2

(12) United States Patent
Stockton

(10) Patent No.: US 7,895,523 B2
(45) Date of Patent: Feb. 22, 2011

(54) METHOD, SYSTEM AND PROGRAM PRODUCT FOR OBSCURING SUPPLEMENTAL WEB CONTENT

(75) Inventor: Marcia L. Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 10/654,687

(22) Filed: Sep. 4, 2003

(65) Prior Publication Data

US 2005/0055644 A1 Mar. 10, 2005

(51) Int. Cl.
*G06F 3/00* (2006.01)
*G06F 3/01* (2006.01)

(52) U.S. Cl. ................. 715/747; 715/744; 715/765; 715/767; 715/789

(58) Field of Classification Search ........... 715/700, 715/764–768, 749, 744, 747, 789; 345/600–605
See application file for complete search history.

(56) References Cited

U.S. PATENT DOCUMENTS

| | | | | |
|---|---|---|---|---|
| 5,682,326 A * | 10/1997 | Klingler et al. | ............ | 715/202 |
| 5,764,866 A * | 6/1998 | Maniwa | ............ | 358/1.15 |
| 6,185,625 B1 * | 2/2001 | Tso et al. | ............ | 709/247 |
| 6,509,974 B1 * | 1/2003 | Hansen | ............ | 358/1.12 |
| 6,583,800 B1 * | 6/2003 | Ridgley et al. | ............ | 715/854 |
| 6,593,944 B1 * | 7/2003 | Nicolas et al. | ............ | 715/744 |
| 6,654,814 B1 * | 11/2003 | Britton et al. | ............ | 709/246 |
| 6,822,663 B2 * | 11/2004 | Wang et al. | ............ | 715/854 |
| 7,012,706 B1 * | 3/2006 | Hansen | ............ | 358/1.15 |
| 7,047,241 B1 * | 5/2006 | Erickson | ............ | 707/9 |
| 7,065,712 B2 * | 6/2006 | Muto et al. | ............ | 715/760 |
| 7,069,592 B2 * | 6/2006 | Porcari | ............ | 726/26 |
| 7,143,091 B2 * | 11/2006 | Charnock et al. | ............ | 707/5 |
| 7,177,488 B2 * | 2/2007 | Berkner et al. | ............ | 382/298 |
| 7,412,646 B2 * | 8/2008 | Parikh et al. | ............ | 715/251 |
| 2002/0033844 A1 * | 3/2002 | Levy et al. | ............ | 345/744 |
| 2002/0191031 A1 * | 12/2002 | Ricard | ............ | 345/838 |
| 2004/0003117 A1 * | 1/2004 | McCoy et al. | ............ | 709/246 |
| 2005/0022114 A1 * | 1/2005 | Shanahan et al. | ............ | 715/513 |
| 2005/0071758 A1 * | 3/2005 | Ehrich et al. | ............ | 715/513 |
| 2006/0277474 A1 * | 12/2006 | Robarts et al. | ............ | 715/745 |
| 2007/0112627 A1 * | 5/2007 | Jacobs et al. | ............ | 705/14 |

OTHER PUBLICATIONS

BBShare.com, No! Flash version 2.1, copyrighted 2002-2005.*
OptiView Technologies, Site Scan, copyrighted 2002.*
VitGroup, VG Banner Shooter, Aug. 2003.*
Michael Foley, AdFree, Jul. 2002.*
"Method of Speeding up Web Pages," Computer Knowledge and Technology, 2003, No. 9, pp. 36-40.

* cited by examiner

*Primary Examiner*—Weilun Lo
*Assistant Examiner*—Nicholas Augustine
(74) *Attorney, Agent, or Firm*—Scott Paul, Esq.; Carey Rodriguez Greenberg Paul, LLP

(57) ABSTRACT

Under the present invention, supplemental web content (e.g., an advertisement) referenced in a requested markup language document is detected and reduced in quality (i.e., obscured). In reducing the supplemental web content in quality, the present invention can employ any number of techniques such as removing color, animation or sound, reducing contrast or resolution, blurring the content, etc. In any event, the requested markup language document is rendered with the reduced quality supplemental web content. The supplemental web content can then be restored to its original quality, if the user so desires, based upon a prompt.

36 Claims, 4 Drawing Sheets

FIG. 2B

My News Portal

Hello, Marcia

Webmail   Calendar   Photos   Chat   Help

Mary's Flowers
Flowers for any occasion
Call 1-800-111-2222 for delivery

Today is Wednesday, August 26th, 2003

Breaking News from AP — 52A
Rebels enter city
Economists question recovery
Government reports unemployment figures
Mother bears healthy quintuplets

Technology News from Reuters — 52C
IBM's WebSphere gains market share
Chip sales down
Virus wreaks havoc on campus
Security remains high-growth area

My Stock Portfolio — 52B
DJIA         7994.29   -5.55
NASDAQ 100   1230.05   -2.46
S&P           612.11   +0.12
IBM            85.95   +4.61

Online Florist — 56

Discount Brokers
First trade free — 56

50
56

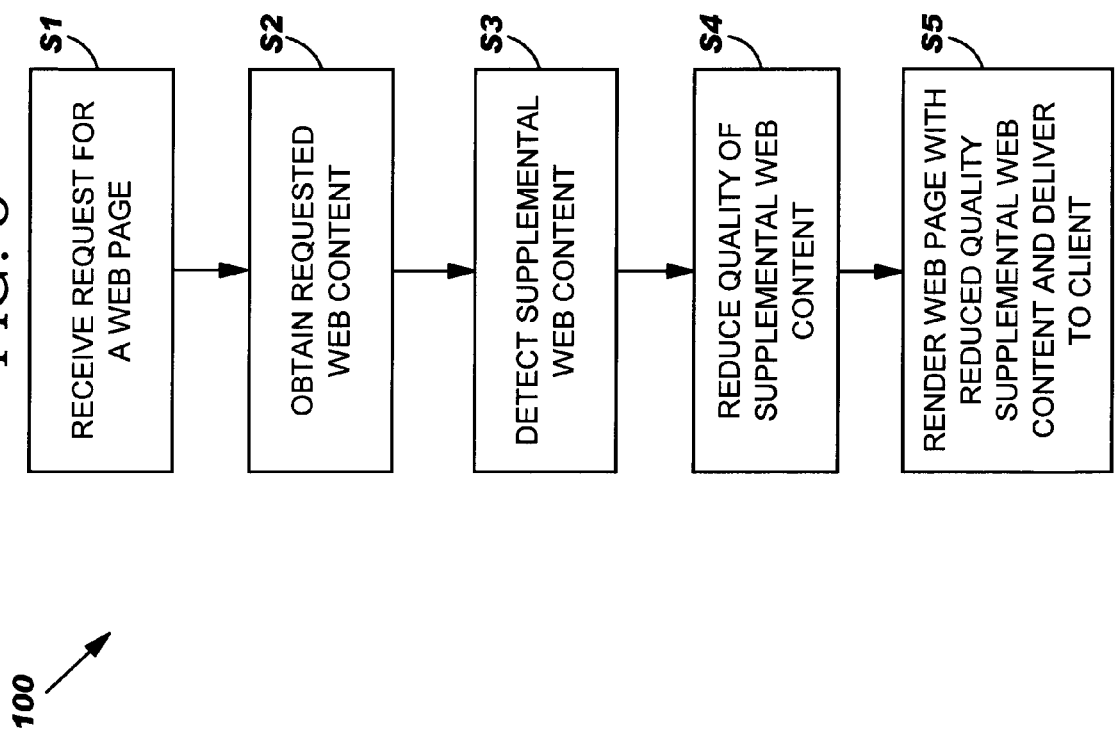

METHOD, SYSTEM AND PROGRAM PRODUCT FOR OBSCURING SUPPLEMENTAL WEB CONTENT

BACKGROUND OF THE INVENTION

1. Field of the Invention

The present invention generally relates to a method, system and program product for obscuring supplemental web content. Specifically, the present invention allows supplemental web content such as advertisements (e.g., pop-up, banner, etc.) to be reduced in quality so that they are less conspicuous on a web page.

2. Related Art

As use of the World Wide Web becomes more pervasive, Internet-based advertising has become a big business. Many of the advertisements now use attention-getting techniques such as animation, sounds, bright colors, etc. Typically, the advertisements are displayed on web pages requested by end-users. For example, if a user requests a certain web page, the web server will often dynamically generate a markup-language page to serve in response to the request by combining references to one or more advertisements with the content that the user requested. Advertising and other types of inserted supplemental content are generally delivered in the form of Uniform Resource Identifier (URI) references within markup language. As is well known, a Uniform Resource Locator (URL) is a specific type of URI. It should be understood that "supplemental content" as used herein can also refer to downloaded fonts, Javascript, Java bytecodes, ActiveX controls, markup language fragments, streaming media, Flash animations, or generally any other type of content that can be embedded in markup language by reference. Typically, the web server serves the markup language document containing such references to the client, and it is the responsibility of the client to request any referenced supplemental content. This is commonly done during the client browser's rendering operation by making a separate request to each web server hosting the supplemental content. Unfortunately, such content can be extremely distracting and annoying to the end-user. This is especially the case since the supplemental content is usually unsolicited. Moreover, supplemental content with advanced features such as animation and sound can consume resources and slow the loading of the pertinent parts of the web page on the client.

Unsolicited advertisements inserted into desired content may often be found on web portal pages. As known, a portal page is generated at a web "portal" server by portal server software (e.g., WebSphere Portal Server™, which is commercially available from International Business Machines Corp. of Armonk, N.Y.). A portal page typically includes sections or visual portlets that each contain certain content formatted according to a user's preferences. For example, a user could establish his/her own portal page that has sections for news, weather and sports. When the portal page is requested, the portal server would obtain the desired content from the appropriate content providers. Once obtained, the content would be aggregated and URI references to advertisements and other supplemental content inserted into the markup language for display in the appropriate sections as a portal web page. This portal technology has lead to the explosion of personalized "home" pages for individual web users.

Currently, many products exist for blocking unwanted supplemental content. These products, sometimes called "ad blockers," are usually conditioned upon regular expression matching against a list of Uniform Resource Identifier (URI) patterns representing known sources of content to be blocked. The list may also be referred to as a "block list." Once such content is detected, the current ad blockers either do not retrieve the content referenced by the URI, or retrieve but do not render the content. In either case, the web page displayed to the user may be distorted from what the web designer intended, since the missing content could leave gaps or affect the layout and spacing of the remaining content. Further, if entries in the block list are incorrect, the ad blocker may incorrectly block valid, desired content. This could prevent pertinent content from reaching the users. Even worse, it could prevent a user from ever realizing that pertinent content has been blocked, making it impossible for the user to know that the block list needs to be corrected, and potentially seriously reducing the quality of the web browsing experience.

In view of the foregoing, there exists a need for a method, system and program product for obscuring supplemental web content such as advertisements. Specifically, a need exists for supplemental content to be detected and reduced in quality so that the web page can still be rendered as intended without distracting the user.

SUMMARY OF THE INVENTION

In general, the present invention provides a method, system and program product for obscuring supplemental web content. Specifically, under the present invention, supplemental web content (e.g., an advertisement) associated with a requested web page is detected and reduced in quality (i.e., obscured). In reducing the supplemental web content in quality, the present invention can employ any number of techniques such as removing color, animation or sound, reducing contrast or resolution, blurring the content, etc. In any event, the requested web page is rendered with the reduced quality supplemental web content. The supplemental web content can then be restored to its original quality if the user so desires, based upon a prompt.

A first aspect of the present invention provides a method for obscuring supplemental web content, comprising: detecting a reference to supplemental web content in requested markup language; reducing a quality of the supplemental web content; and rendering the requested markup language with the reduced quality supplemental web content.

A second aspect of the present invention provides a system for obscuring supplemental web content, comprising: a content detection system for detecting a reference to supplemental web content associated with a requested web page; a quality reduction system for reducing a quality of the supplemental web content; and a communication system for serving the requested web page with the reduced quality supplemental web content.

A third aspect of the present invention provides a program product stored on a recordable medium for obscuring supplemental web content, which when executed comprises: program code for detecting a reference to supplemental web content associated with a requested web page; program code for reducing a quality of the supplemental web content; and program code for serving the requested web page with the reduced quality supplemental web content.

A fourth aspect of the present invention provides a computer-implemented business method for obscuring supplemental web content, comprising: collecting a fee from a user; receiving a request for markup language from the user, wherein the markup language includes a reference to supplemental web content; obscuring the supplemental web content; and serving the requested markup language with the obscured supplemental web content to the user.

Therefore, the present invention provides a method, system and program product for obscuring supplemental web content.

BRIEF DESCRIPTION OF THE DRAWINGS

These and other features of this invention will be more readily understood from the following detailed description of the various aspects of the invention taken in conjunction with the accompanying drawings in which:

FIG. 2B depicts the web portal page of FIG. 2A with the supplemental web content reduced in quality, according to the present invention.

FIG. 3 depicts a method flow diagram according to the present invention.

Figure 1:
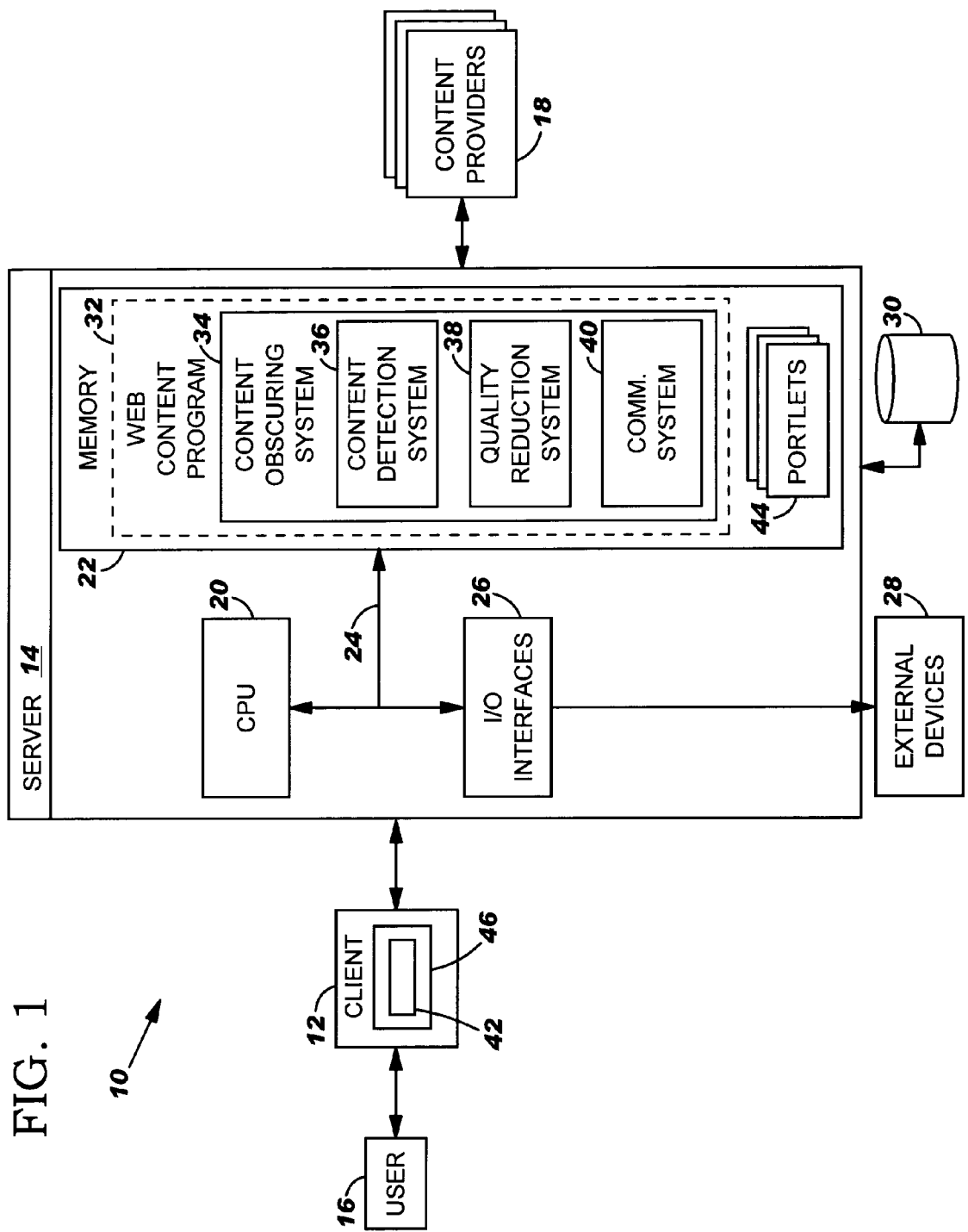
FIG. 1 depicts a system for obscuring supplemental web content, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for obscuring supplemental web content. Specifically, under the present invention, supplemental web content (e.g., an advertisement) associated with a requested web page is detected and reduced in quality (i.e., obscured). In reducing the supplemental web content in quality, the present invention can employ any number of techniques such as removing color, animation or sound, reducing contrast or resolution, blurring the content, etc. In any event, the requested web page is rendered with the reduced quality supplemental web content. The supplemental web content can then be restored to its original quality if the user so desires, based upon a prompt. It should be understood in advance that as used herein, the term "supplemental content" is intended to refer to advertisements, images, downloaded fonts, Javascript, Java bytecodes, ActiveX controls, markup language fragments, streaming media, Flash animations, or generally any other type of content that can be embedded in markup language by reference.

Referring now to FIG. 1, a system 10 for obscuring web supplemental web content according to the present invention is shown. As depicted, system 10 includes client 12 that communicates with server 14 to obtain web content. In general, server 14 is intended to represent any type of web server that can deliver markup languages (e.g., web content such as web pages) to client 12. Markup languages are well-known in the art and include not only the venerable hypertext markup language (HTML), but also extensible markup language (XML), wireless markup language (WML), and numerous variants of the standardized generalized markup language (SGML), to name a few. As will be recognized by the skilled artisan, such electronic documents include Web pages, among other forms of displayable content. A markup language document can define not only that content which can be viewed through a content browser such as a Web browser (herein referred to as a "browser"), but also supplemental content which can be presented in association with the content. Content which is supplemental to the markup can include not only advertisements (typically in the form of embedded image references), but also embedded references to media, references to other markup language documents, markup language fragments, other types of documents, programs, scripts, and the like. In this regard, supplemental content is any content which can be loaded by or with the assistance of a browser based upon the markup in which a reference to the supplemental content has been embedded. Examples can include an image reference which can be loaded automatically, or a script or page which can be activated responsive to a user event such as when a user passes a mouse pointer over a specified portion of the markup as rendered in the browser.

In any event, server 14 could be an application server, portal server or the like. Typically, user 16 will operate client 12 to request web content (e.g., web pages). Server 14 will process the requests, obtain the necessary web content from content providers 18, generate markup language including the requested web content as well as possibly references to supplemental content, and serve the markup language to client 12. To this extent, client 12 can be any type of computerized device capable of communicating with server 14. For example, client 12 could be a personal computer, a hand held device, a cellular telephone, etc.

The teachings of the present invention are typically implemented in a network environment such as the Internet, a wide area network (WAN), a local area network (LAN), a virtual private network (VPN), etc. To this extent, communication between client 12 and server 14 could occur via a direct hardwired connection (e.g., serial port), or via an addressable connection that may utilize any combination of wireline and/or wireless transmission methods. Server 14 and client 12 may utilize conventional network connectivity, such as Token Ring, Ethernet, WiFi or other conventional communications standards. Moreover, connectivity could be provided by conventional TCP/IP sockets-based protocol. In this instance, client 12 would utilize an Internet service provider to establish connectivity to server 14.

As depicted, server 14 generally comprises central processing unit (CPU) 20, memory 22, bus 24, input/output (I/O) interfaces 26, external devices/resources 28 and storage unit 30. CPU 20 may comprise a single processing unit, or be distributed across one or more processing units in one or more locations, e.g., on a client and computer system. Memory 22 may comprise any known type of data storage and/or transmission media, including magnetic media, optical media, random access memory (RAM), read-only memory (ROM), a data cache, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LCD screen, hand-held device, keyboard, mouse, voice recognition system, speech output system, printer, monitor/display, facsimile, pager, etc. Bus 24 provides a communication link between each of the components in server 14 and likewise may comprise any known type of transmission link, including electrical, optical, wireless, etc.

Storage unit 30 can be any system (e.g., a file system or database) capable of providing storage for information under the present invention. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into server 14. Further, it is understood that client 12 will typically include the same components (e.g., CPU, memory, etc.) as shown and described with reference to server 14. These components have not been separately shown and discussed for brevity.

Shown in memory 22 of server 14 is web content program 32 (shown in phantom), which can represent any type of program that is capable of obtaining and rendering web content for user 16. For example, web content program 32 can be an application server program such as WebSphere Application Server, or a portal program such as WebSphere Portal Server (both of which are commercially available from International Business Machines Corp. of Armonk, N.Y.). In the case of the latter, web content program 32 would receive requests from client 12 and interface with one or more portlets 44 to obtain the content from content providers 18. For example, if user 16 requested a personalized home page with portlets for Breaking News from AP and Technology News from Reuters, web content program 32 would call the Breaking News from AP and Technology from Reuters portlets 44, which would obtain the corresponding web content from the appropriate content providers 18. In any event, it should be appreciated that web content program 32 would include additional, well-known systems that are not depicted in FIG. 1.

Shown within web content program 32 is content obscuring system 34, which will obscure supplemental web content according to the present invention. It should be understood that content obscuring system 34 is shown within web content program 32 for illustrative purposes only. For example, content obscuring system 34 could exist separate from, and work in conjunction with, web content program 32. Furthermore, content obscuring system 34 could alternatively be loaded on client 12. Accordingly, the embodiment depicted in FIG. 1 and its corresponding description is only intended to be illustrative of one possible embodiment of the present invention.

In general, user 16 will operate web browser 46 on client 12 to request web content. Assume in this example that the requested web content is a web page. The request will be received by web content program 32, which will obtain the necessary web content to build the page. However, as indicated above, the obtained web content might not only include desired web content, but also supplemental web content such as unsolicited advertisements, typically in the form of URI references within markup language. For example, referring to FIG. 2A, an illustrative web portal page 50 is shown. As depicted, web page 50 includes portlets for Breaking News from AP 52A, My Stock Portfolio 52B and Technology News from Reuters 52C. Web page 50 also includes supplemental web content 54 in the form of banner advertisements. The colors, sounds, animation, etc. of supplemental web content 54 not only distracts user 16, but also consumes client 12 resources.

Referring back to FIG. 1, under the present invention, content detection system 36 will first detect/identify references to the supplemental web content in the requested web page (i.e., markup language). Typically, this is accomplished by comparing (e.g., using regular expression matching) all URI references in the markup language document against a predetermined list of URIs or partial URI patterns representing sources of content to be obscured. The predetermined list could be stored in storage unit 30. Accordingly, any URIs referenced in the markup language that match an entry on the predetermined list represents supplemental web content to be obscured.

In one aspect of the invention, the quality reduction system 38 resides on server 14. In this aspect, after obtaining the web content on server 14, quality reduction system 38 will reduce a quality of the detected supplemental web content. That is, the quality of any web content whose URI matched a URI in the list will be reduced. In a typical embodiment, quality reduction system 38 will reduce the quality of an image by substituting a gray-scale palette for a full color pallette. This can be done by changing the URI representing the image; or providing Javascript specifying a base and alternate version of the image, the alternate version displayable when the mouse cursor is positioned within the image's area; or serving a reduced-quality image in response to a request from the browser for the referenced image. However, many other alternatives are possible. For example, quality reduction system 38 could lower the contrast of the supplemental web content, lower the resolution of the supplemental web content, blur the supplemental web content (e.g., via Gaussian blurring), reduce the quantity of colors of the supplemental web content, disengage/remove any animation in the supplemental web content, disengage/remove any sound of the supplemental web content, or any combination thereof, etc. Regardless, one or more algorithms for reducing the quality of the supplemental web content could be maintained in storage unit 30. This would provide uniformity and predictability for quality reduction. For example, an algorithm could state: "disengage animation, disengage sound, replace colors with gray-scale, and lower the contrast by 30%." The list could associate a specific obscuration algorithm with each URI or URI pattern on the list.

In any event, once the supplemental web content has been reduced in quality, communication system 40 will serve the markup with the reduced quality supplemental content to client 12 where it will be rendered in browser 46 (e.g., by a content rendering system not shown). Specifically, instead of the supplemental web content being in its original quality, it will be shown in the reduced quality. Thus, the layout of the requested web page can be preserved without user 16 being distracted or system resources being consumed.

Figure 2A:
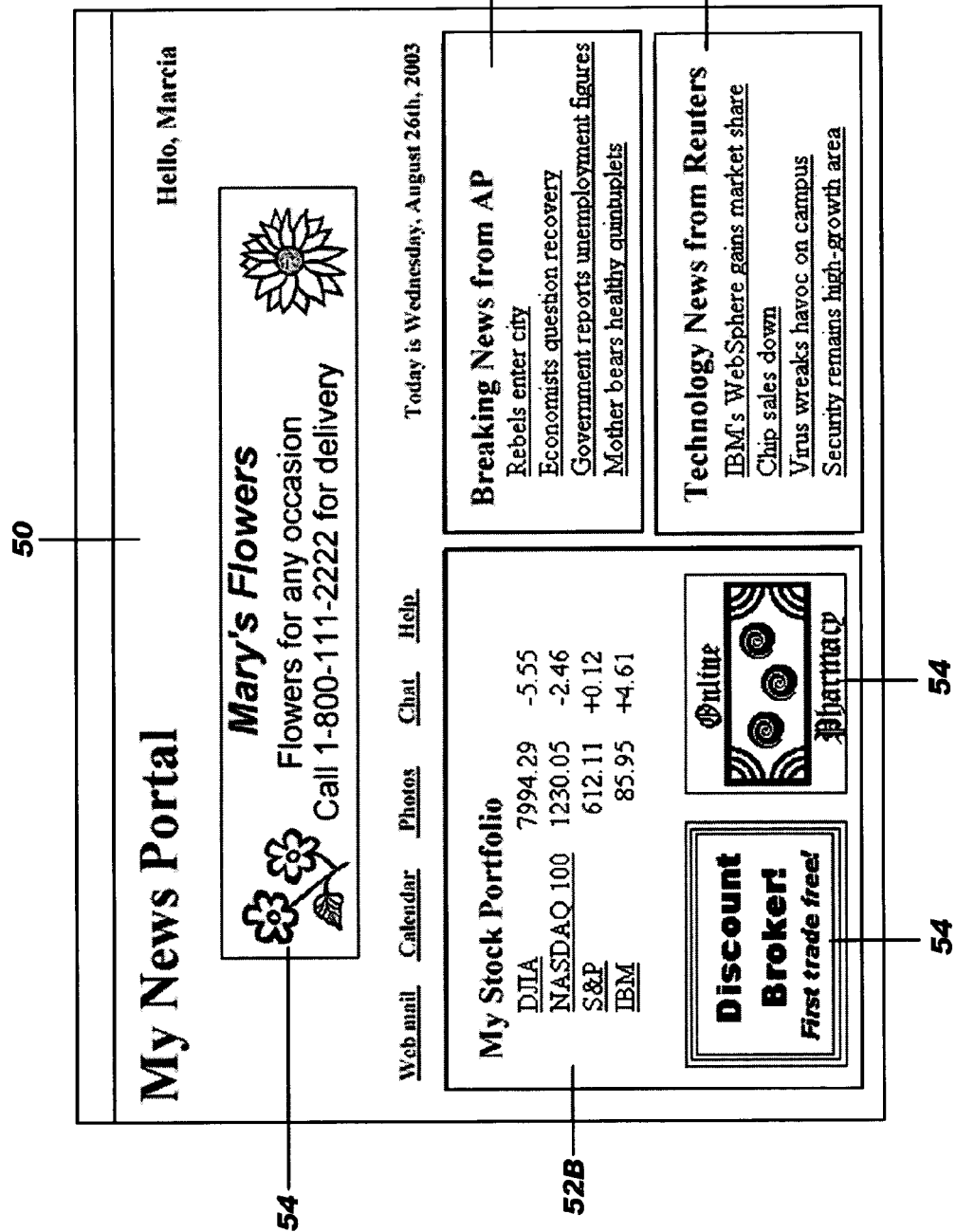
FIG. 2A depicts an illustrative web portal page with supplemental web content.

Referring to FIG. 2B, web page 50 from FIG. 2A is shown with reduced quality supplemental web content 56. As can be seen schematically, the advertisements of FIG. 2A have been converted to gray-scale. Thus, the blocks of content still appear, but are far less intrusive. Moreover, they serve as a place-holder preserving the structure and page layout intended by the Web page designer. It should be understood that the reduction in quality shown in FIG. 2B is intended to be illustrative of only one of many possible ways to reduce the quality of supplemental web content 54 (FIG. 2A).

If upon viewing the web page, user 16 wishes to see the reduced quality supplemental web content in its original quality, he or she can do by interacting with browser 46 (FIG. 1). For example, in one embodiment, the web page is communicated to browser 46 along with any algorithms used to reduce the quality of the supplemental web content. When user 16 so prompts, quality restoration system 42 (e.g., Javascript) (FIG. 1) within browser 46 can use the algorithms to restore the quality of the supplemental web content. In prompting for the quality to be restored, user 16 will typically place his/her mouse cursor over the reduced quality supplemental web content 56 (FIG. 2B) on the web page 50 (FIG. 2B). Once prompted, user 16 will view the supplemental web content 54 (FIG. 2A) in its original quality (e.g., full color, animation, sounds, etc.). It should be appreciated, that restoration of the supplemental web content to its original quality could be accomplished based upon any type of prompt by user 16. Other examples include restoration menu buttons, toolbar icons, etc.

In one preferred embodiment where the content to be obscured is an image and the quality reduction system 38 resides on the server 14, the markup language document can include Javascript specifying a base (reduced-quality) version and an alternate (full-quality) version of an image to be obscured. When the Javascript is interpreted at the client, the Web browser can first render the reduced-quality image, but later substitute the full-quality image in place of the reduced-quality image when the user positions the mouse cursor within the obscured image. With this embodiment the invention can be implemented without any changes to existing Web browser logic. Similarly, if the blocked content is an animated image, the animation can be played when the cursor is positioned within the image's area, and otherwise not played. Likewise, if the blocked content includes audio, the audio can be suppressed for a reduced-quality rendering, and played if the user selects the blocked content. The above are merely examples by way of illustration and not limitations.

In another embodiment, the quality reduction system 38 can reside entirely on the client 12, and the obscuration algorithms can be any that are feasibly implementable on a client device. This embodiment requires a modification to existing Web browser logic.

Regardless of the function placement for the quality reduction system 38, as a result the user retains complete control over whether to view or hear or perceive the obscured content. In case the content is desired content that has been blocked inadvertently due to an error in the block list, the user now has the opportunity to easily obtain a full-quality rendering for the individual item of blocked content and if desired, correct the block-list error.

Referring now to FIG. 3, a method flow diagram 100 according to the present invention is shown. In step S1, a request for a web page is received. In step S2, the corresponding web content is obtained. In step S3, supplemental web content is detected. As indicated above, this is accomplished by comparing URI references in the markup language to those in a predetermined list. For a server-based function placement of the content obscuring system 34, in step S4, any detected supplemental web content is reduced in quality and in step S5, the markup language for the web page with references to the reduced-quality supplemental content is served to the client for rendering at the client.

Alternatively (for a client-based function placement of the content obscuring system 34), in step S1, a request for a web page is received. In step S2, the corresponding web content is obtained and served to the client. In step S3 supplemental web content is detected by comparing, at the client, URI references in the received markup language request against a predetermined list. In step S4, any detected supplemental web content is reduced in quality by performing specified algorithms at the client. In step S5, the markup language for the web page is rendered at the client with the reduced quality supplemental web content.

The present invention, particularly in its server-based embodiments, can advantageously be used in methods of doing business by providing varying levels of obscuration for a fee. For example, a web portal site may choose to offer three levels of service to customers/users. Customers wishing free service could receive the lowest level of service, with no supplemental content obscured; thus they are fully exposed to all the advertising, sounds, animation, etc. that is served along with the desired content. Customers who pay a small fee could receive a middle level of service where some of the supplemental content is obscured, or obscured to a limited degree. Premium customers who choose to the highest level of service could pay the highest fees, and in return receive the web content with all supplemental content fully obscured. The fee might be charged based on the number of web page visits, the customer's patronage of specified advertisers, the total value of transactions performed at the web site, the number of advertisements viewed unobscured, etc. Or, the fee might be assessed using a subscription model whereby customers pay a fixed fee periodically. In any event, a "fee" is intended to mean any type of legal detriment such as monetary exchange, goods/services exchange, etc. Further, a "fee" could be in the form of a user's willingness to allow his/her personal information to be given/sold to third parties.

It should be understood that the present invention can be realized in hardware, software, or a combination of hardware and software. Any kind of computer system(s)- or other apparatus adapted for carrying out the methods described herein— is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, as briefly outlined above in reference to FIG. 3, any of the systems of content obscuring system 34 could be implemented on client 12 as opposed to server 14. This would make client 12 the point of quality reduction and restoration. Similarly, although quality restoration system 42 is shown on client 12, it could be implemented on server 14. In this case, it would not be necessary to communicate the web page to client 12 with the quality reduction algorithms. Rather, when prompted by user 16 to restore the quality, a request that identifies the particular supplemental web content could be communicated to server 14. At the server 14, quality restoration system 42 could restore the quality to the identified web content and re-serve the web page to client 12, or simply communicate the restored supplemental web content to browser 16 to replace the reduced quality supplemental web content in the web page.

I claim:

1. A method for obscuring only supplemental audio-visual web content on a web page, comprising:
    detecting a reference to supplemental web content in requested markup language;
    reducing an audio-visual quality of the supplemental web content while allowing the supplemental web content with the reduced quality to be executed in its entirety on a client, wherein the reducing includes
specifying a full-quality version of the supplemental web content to be reduced, and
specifying a reduction in the audio-visual quality of the supplemental web content;
rendering the requested markup language with the reduced quality supplemental web content; and
displaying the entirety of the reduced quality supplemental web content and the original quality requested web page content, wherein an original layout of the requested web page is preserved; and
restoring the full-quality version of the supplemental web content in the rendered markup language based on a prompt by a user, wherein
the reducing step comprises removing animation from the supplemental web content.

2. The method of claim 1, wherein the detecting step comprises comparing a uniform resource identifier of the supplemental web content to a predetermined list of uniform resource identifiers.

3. The method of claim 1, wherein the reducing step comprises lowering a contrast of the supplemental web content.

4. The method of claim 1, wherein the reducing step comprises lowering a resolution of the supplemental web content.

5. The method of claim 1, wherein the reducing step comprises blurring the supplemental web content.

6. The method of claim 1, wherein the reducing step comprises substituting a gray-scale palette for a color palette of the supplemental web content.

7. The method of claim 1, wherein the reducing step comprises lowering a quantity of colors in the supplemental web content.

8. The method of claim 1, wherein the reducing step comprises removing sound from the supplemental web content.

9. A system for obscuring only supplemental audio-visual web content on a web page, comprising:
a content detection system for detecting a reference to supplemental web content associated with a requested web page;
a quality reduction system for reducing an audio-visual quality of the supplemental web content while allowing the supplemental web content with the reduced quality to be executed in its entirety on a client, wherein the reducing includes
specifying a full-quality version of the supplemental web content to be reduced, and
specifying a reduction in the audio-visual quality of the supplemental web content;
a communication system for serving the requested web page with the reduced quality supplemental web content;
a display system for displaying the entirety of the reduced-quality supplemental web content and the original quality requested web page content, wherein an original layout of the requested web page is preserved; and
a quality restoration system for restoring the full-quality version of the supplemental web content in the rendered web page based on a prompt by a user, wherein
the quality reduction system removes animation from the supplemental web content.

10. The system of claim 9, wherein the content detection system compares a uniform resource locator of the supplemental web content to a predetermined list of uniform resource locators.

11. The system of claim 9, wherein the quality reduction system lowers a contrast of the supplemental web content.

12. The system of claim 9, wherein the quality reduction system lowers a resolution of the supplemental web content.

13. The system of claim 9, wherein the quality reduction system blurs the supplemental web content.

14. The system of claim 9, wherein the quality reduction system substitutes a gray-scale palette for a color palette of the supplemental web content.

15. The system of claim 9, wherein the quality reduction system lowers a quantity of colors in the supplemental web content.

16. The system of claim 9, wherein the quality reduction system removes sound from the supplemental web content.

17. The system of claim 9, wherein the system is loaded on a server that renders and delivers the web page to a client.

18. The system of claim 17, wherein the server is a portal server, and wherein the web page is a portal page.

19. A program product stored on a recordable storage medium for obscuring only supplemental audio-visual web content on a web page, which when executed comprises:
program code for detecting a reference to supplemental web content associated with a requested web page;
program code for reducing an audio-visual quality of the supplemental web content while allowing the supplemental web content with the reduced quality to be executed in its entirety on a client, wherein the reducing includes
specifying a full-quality version of the supplemental web content to be reduced, an
specifying a reduction in the audio-visual quality of the supplemental web content; and
program code for serving the requested web page with the reduced quality supplemental web content; and
program code for displaying the entirety of the reduced quality supplemental web content and the original quality requested web page content, wherein an original layout of the requested web page is preserved; and
program code for restoring the full-quality version of the supplemental web content in the rendered web page based on a prompt by a user, wherein
the program code for reducing removes animation from the supplemental web content.

20. The program product of claim 19, wherein the program code for detecting compares a uniform resource locator of the supplemental web content to a predetermined list of uniform resource locators.

21. The program product of claim 19, wherein the program code for reducing lowers a contrast of the supplemental web content.

22. The program product of claim 19, wherein the program code for reducing lowers a resolution of the supplemental web content.

23. The program product of claim 19, wherein the program code for reducing blurs the supplemental web content.

24. The program product of claim 19, wherein the program code for reducing substitutes a gray-scale palette for a color palette of the supplemental web content.

25. The program product of claim 19, wherein the program code for reducing lowers a quantity of colors in the supplemental web content.

26. The program product of claim 19, wherein the program code for reducing removes sound from the supplemental web content.

27. The program product of claim 19, wherein the program product is loaded on a server that renders and delivers the web page to a client.

28. The program product of claim 27, wherein the server is a portal server, and wherein the web page is a portal page.

29. A computer-implemented business method for obscuring only supplemental audio-visual web content on a web page, comprising:
   collecting a fee from a user;
   receiving a request for markup language from the user, wherein the markup language includes a reference to supplemental web content;
   partially obscuring the supplemental web content while allowing the partially obscured supplemental web content to be executed in its entirety on a client, wherein the partial obscuring includes
      specifying a full-quality version of the supplemental web content to be partially obscured, and
      specifying a partial obscuring of the audio-visual quality of the supplemental web content; and
   serving the requested markup language with the partially obscured supplemental web content to the user; and
   displaying the entirety of the partially-obscured supplemental web content and the original quality requested web page content, wherein an original layout of the requested web page is preserved; and
   restoring the full-quality version of the supplemental web content in the rendered markup language based on a prompt by a user, wherein the prompt includes positioning a mouse cursor over the supplemental web content with the reduced quality, wherein the partially obscuring step comprises removing animation from the supplemental web content.

30. The method of claim 29, further comprising detecting the reference to the supplemental web content by comparing a uniform resource identifier of the supplemental web content to a predetermined list of uniform resource identifiers.

31. The method of claim 9, wherein the partially obscuring step comprises lowering a contrast of the supplemental web content.

32. The method of claim 9, wherein the partially obscuring step comprises lowering a resolution of the supplemental web content.

33. The method of claim 29, wherein the partially obscuring step comprises blurring the supplemental web content.

34. The method of claim 29, wherein the partially obscuring step comprises substituting a gray-scale palette for a color palette of the supplemental web content.

35. The method of claim 29, wherein the partially obscuring step comprises lowering a quantity of colors in the supplemental web content.

36. The method of claim 29, wherein the partially obscuring step comprises removing sound from the supplemental web content.

* * * * *